Figure 1:
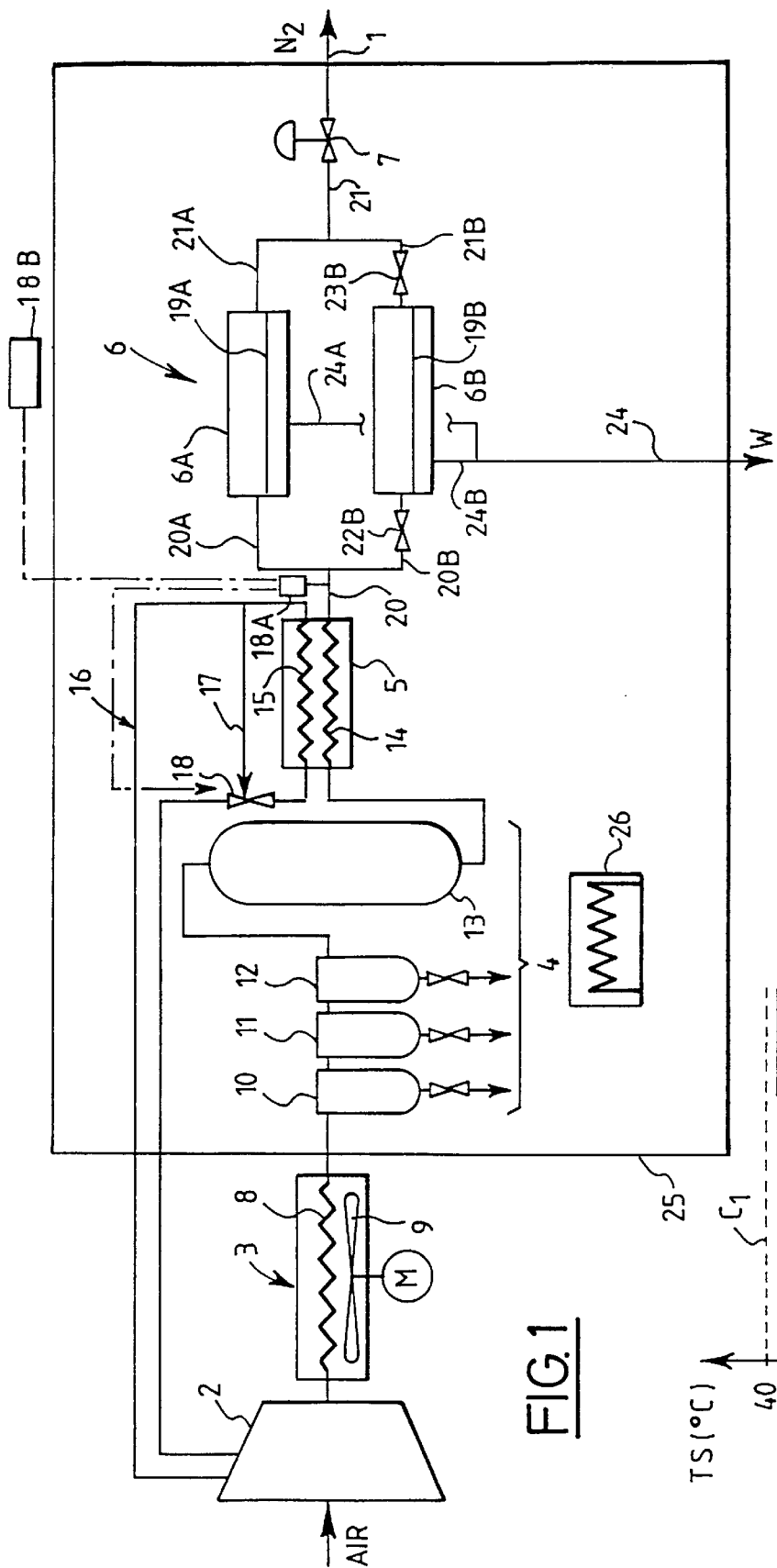

United States Patent [19]
Barry

[11] Patent Number: 5,829,272
[45] Date of Patent: Nov. 3, 1998

[54] PROCESS AND INSTALLATION FOR THE SEPARATION OF AIR BY PERMEATION, FOR THE PRODUCTION OF NITROGEN

[75] Inventor: Lionel Barry, Charenton Le Pont, France

[73] Assignee: L'Air Liquide, Societe Anonyme Pour L'Etude et L'Exploitation des Procedes Georges Claude, Paris Cedex, France

[21] Appl. No.: 808,172

[22] Filed: Feb. 28, 1997

[30] Foreign Application Priority Data

Feb. 28, 1996 [FR] France ................................ 96 02449

[51] Int. Cl.⁶ .................................................. B01D 53/22
[52] U.S. Cl. .................................................. 62/655; 95/54
[58] Field of Search .......................... 62/655; 95/54

[56] References Cited

U.S. PATENT DOCUMENTS

| | | |
|---|---|---|
| 4,787,919 | 11/1988 | Campbell et al. . |
| 5,388,413 | 2/1995 | Major et al. .................. 62/655 X |
| 5,425,801 | 6/1995 | Prasad .................................. 95/15 |
| 5,429,662 | 7/1995 | Fillet .................................... 95/14 |
| 5,582,030 | 12/1996 | Dannohl ........................ 62/655 X |

FOREIGN PATENT DOCUMENTS

| | | |
|---|---|---|
| 0 075 431 | 3/1983 | European Pat. Off. . |
| 0 520 863 | 12/1992 | European Pat. Off. . |
| 0 588 705 | 3/1994 | European Pat. Off. . |
| 0 655 272 | 5/1995 | European Pat. Off. . |
| 0 659 464 | 6/1995 | European Pat. Off. . |

*Primary Examiner*—Christopher Kilner
*Attorney, Agent, or Firm*—Young & Thompson

[57] ABSTRACT

A process and installation for the separation of air by permeation, for the production of high purity nitrogen. The installation comprises in series an air compressor (2), a refrigerator (3) cooled by air or water, a unit (4) for filtering out oil and water, an air reheater (5) and a permeator (6). The air reheater (5) is provided with a device (18A) for adjusting the temperature as a function of the temperature of the final refrigeration fluid that cools the compressed air.

20 Claims, 1 Drawing Sheet

PROCESS AND INSTALLATION FOR THE SEPARATION OF AIR BY PERMEATION, FOR THE PRODUCTION OF NITROGEN

This application corresponds to French application 96 02449 of Feb. 28, 1996, the disclosure of which is incorporated herein by reference.

The present invention relates to a process for the separation of air by permeation for the production of nitrogen, of the type in which air is compressed, and if desired, mixed with a recycled gas from the permeation step, refrigerated, purified, and introduced as purified air into a permeator, the temperature of the air entering the permeator being adjusted to a value TS at least equal to the temperature TA of the final refrigeration fluid of the compressed air, increased by a predetermined temperature difference ΔT.

Semi-permeable membranes separate numerous gaseous mixtures. Permeation takes place under the influence of a partial pressure difference on opposite sides of the membranes. The permeate, which is to say the gas that passes through the membrane, is enriched in the most permeable components, and the residue (or retentate) in the least permeable components.

The separation properties of membranes depend largely on temperature. In the usual operating range, most membranes follow an Arrhenius-type law. For example, in the case of a binary separation:

$$Perm_A = Perm_{AO} \cdot \exp \frac{-E_a(A)}{RT} \quad (1)$$

$$Perm_B = Perm_{BO} \cdot \exp \frac{-E_a(B)}{RT} \quad (2)$$

$Perm_A$: permeability of component A (speed of permeation of A for a unitary partial pressure difference in component A)
$Perm_B$: permeability of component B
$Perm_{AO}$, $Perm_{BO}$: constants
$E_a(A)$, $E_a(B)$: activation energies (constants)
T: absolute temperature
R: perfect gas constant
The selectivity, defined by the ratio of permeabilities $$\frac{Perm_A}{Perm_B} \text{ (if } Perm_A > Perm_B\text{),}$$

constitutes a measure of the efficiency of the separation. It depends on the temperature:

$$sel = sel_O \cdot \exp \frac{E_a(B) - E_a(A)}{RT} \quad (3)$$

In the use in the production of nitrogen from atmospheric air, the most permeable component (component A) is oxygen and the nitrogen (component B), which constitutes the retentate of the permeation, can be recovered industrially with high purity. The membranes used are generally polymer membranes. What follows will be limited to this use.

The argon in the air is divided between the permeate and the retentate and, being an inert gas, it is more often accepted with the nitrogen. Hereinafter, the term "nitrogen purity" means the purity of the inert gases (nitrogen+argon). This purity can reach a value industrially, with a suitable output, of the order of 99%.

When the temperature rises, the relations (1) and (2) above show that the permeabilities increase, and the same is true for the nitrogen production of the membranes, which is the nitrogen flow rate produced by a unit area of membrane for a given purity and supply pressure. However, this increase of flow rate requires an increase of the entering air flow.

On the other hand, according to equation (3), as $E_a(O_2) < E_a(N_2)$, the selectivity decreases, and the same is true for the nitrogen output, which is the ratio of the flow of the retentate to the supply air flow, at constant purity.

Thus, the choice of the separation temperature constitutes a compromise between productivity and separation output. It depends on the selectivity, on the activation energies, on the ratio of the cost per unit area to the oxygen permeability of the membrane (and more generally to the capital cost), on the rate of use of the separation unit, and on the cost of energy.

For current purities, less than or equal to 93%, the selectivity is not a critical parameter, and it is preferable to operate at relatively high temperature. On the contrary, when high purities of the order of 99% are sought, it is economically interesting to reduce the temperature of the treated air.

To lower this temperature, the most economical way consists in using an air refrigerator, or if desired refrigerated water, at the outlet of the air compressor. There is thus achieved a temperature of the order of TA+2° C., where TA is the temperature of the last cooling fluid used in the refrigerator.

However, to avoid any risk of the presence of liquid water in the permeator, which would upset its operation by reducing its useful area, it is necessary to reheat the air, by several degrees, after filtration for water and oil, to bring its relative humidity down from 100% to less than 80%, which is referred to as desaturation of the air before permeation.

Therefore, the separation temperature TS must always be at least equal to TA+ΔT, where ΔT is a predetermined difference, that is often chosen to be at least equal to 5° C.

For the sake of simplicity, the usual technique consists in working at a constant temperature TS, higher for example by 5° C. than the maximum foreseeable temperature TA of the last cooling fluid mentioned above. Typically, TS is chosen to be equal to about 40° C. for a compressor provided with a final air refrigerant and operating at a maximum ambient temperature of 35° C.

However, as indicated above, such a temperature TS almost never corresponds, in the course of use of the installation, to the optimum economically when high purity nitrogen is produced.

The invention therefore has for its object to improve the economy of the production of high purity nitrogen.

To this end, the invention has for its object a process of the mentioned type, characterized in that:

(a) for values of temperature TA at most equal to a first threshold TA1, the temperature TS is adjusted to the constant value TS1=TA1≧ΔT;

(b) for values of the temperature TA between TA1 and a second value TA2 higher than TA1, the temperature TS is adjusted to a value such that TS−TA≧ΔT.

The process according to the invention can comprise one or several of the following characteristics:

the value of TS is a constant value TS2 for all intervals TA1, TA2 of the temperature TA;

for values of the temperature TA at most equal to TA1, there is used a first permeation area A1, whilst for values TA of the temperature comprised between TA1 and TA2, the permeation area is reduced to a second value A2 smaller than A1;

for values of the temperature TA between TA2 and a value TA3 higher than TA2, the temperature TS is adjusted to a constant value TS3 such that TS3−TA3≧ΔT;

for values of the temperature TA comprised between TA2 and a value TA3 higher than TA2, the area of permeation is again reduced, to a third value A3 lower than A2;

for an interval of values of the temperature TA higher than TA1, TS is adjusted to a variable value TA+ΔT;

the values of TA1 and ΔT are respectively about 25° C. and about 5° C.

The invention also has for its object an installation for the production of nitrogen, adapted to practice the process defined above.

This installation, of the type comprising, mounted in series, an air compressor, an air-cooled or water-cooled refrigeration unit, a water and oil filtration unit, an air reheater, a permeator, is characterized in that the air reheater is provided with adjustment means of the temperature TS of the air entering the permeator as a function of the temperature TA of the final refrigeration fluid of the refrigerant.

According to other characteristics of this installation:

the air reheater comprises a passage for calorigenic fluid and an adjustable bypass for this passage;

the permeator comprises at least two permeation assemblies, at least one of these assemblies being provided with means to put it out of service.

Figure 2:
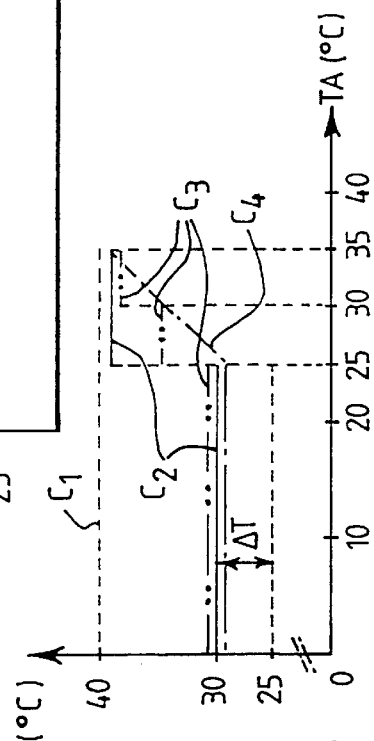

Examples of operation of the invention will now be described with respect to the accompanying drawing, in which:

FIG. 1 shows schematically an installation for the production of nitrogen according to the invention; and FIG. 2 is a comparative diagram for illustrating the invention.

The installation shown in FIG. 1 is adapted to produce, in an outlet conduit 1, nitrogen having a purity of 99% (purity in nitrogen+argon), under a substantially constant pressure over all the range of acceptable ambient temperatures for the air compressor 2, namely up to about 35° C. The installation comprises, successively, downstream of the compressor 2, an air refrigerator 3, a water and oil filtration unit 4, an air reheater 5, a permeator 6 and a flow rate adjustment valve 7.

The refrigerator 3 comprises a radiator traversed by a coil 8 for the circulation of air compressed in 2. In this radiator is disposed a fan 9, which blows atmospheric air over the coil 8.

The filter unit comprises successively a cyclone 10 for elimination of the larger drops of liquid, then a coarse coalescence filter 11 and a fine coalescence filter 12, for eliminating the residual droplets, and finally a carbon tower 13 which eliminates the oil vapors.

The air reheater 5 is an indirect countercurrent heat exchanger which comprises passages 14 for filtered air, and passages 15 for the countercurrent circulation of lubricating and cooling oil of the compressor. The oil circuit 16 comprises moreover a bypass 17 to the exchanger, the flow circulating in this bypass being adjusted by means of a three-way valve 18 controlled by a detector 18A of the temperature of the air entering the permeator. A detector 18B measures a temperature TA of the last cooling fluid used in the refrigerator 3, which may be of the ambient temperature when ambient air is the last cooling fluid, or a water temperature when water is the last cooling fluid.

The permeator 6 includes of two separate permeation assemblies 6A and 6B mounted in parallel and whose membranes are shown at 19A and 19B respectively. In practice, each assembly 6A, 6B comprises one or several permeation modules of which each encloses a bundle of tubular membranes, the air to be separated being introduced within these tubes. In the case in which an assembly 6A or 6b comprises plural modules, these latter can be arranged in different ways, as is well known in the art.

The conduit 20 which carries the air leaving the exchanger 5, is divided into two branches 20A, 20B leading to the inlet of the two assemblies 6A, 6B, respectively. The nitrogen which is produced (retentate) leaves them via conduits 21A, 21B, which reunite in a single conduit 21. This latter, downstream of the valve 7, forms the production conduit 1. The conduits 20B and 21B are each provided with a shut off valve 22B and 23B, respectively. The permeates of the two assemblies, constituted by air enriched in oxygen, are removed as residue W from the installation, via two conduits 24A, 24B which reunite in a single conduit 24.

The elements 4 to 7 are disposed in an enclosure 25 which is temperature controlled by means of a heating device 26, which is controlled by the detector 18B in a manner described in EP 0 588 705 of the same applicant. This maintains the temperature of the membranes near each other during stoppages of the installation.

The installation thus described operates in the following manner:

When the temperature TA of the last cooling fluid is below or equal to 25° C., the valves 22B and 23B are open, such that all the air for permeating the two assemblies 6A and 6B is used. The reheater 5 is adjusted to supply at 20, air at 25°+5°=30° C.

When the temperature TA exceeds 25° C., the valves 22b and 23B are closed and, simultaneously, the detector 18A causes the reference point of the reheater 5 to pass to 40° C. Conversely, when the ambient temperature falls below 25° C., the valves 22B and 23B are again opened and, simultaneously, the detector 18A returns the control point of the reheater 5° to 30° C.

In this way, when ambient air is the last cooling fluid and for high ambient temperatures, the pressure of the nitrogen produced can be maintained substantially constant, thanks to the use as needed, of the permeator at the capacity of the compressor.

In FIG. 2, there is shown in broken lines (curve C1) the conventional process mentioned above, in which the separation temperature TS is constant and equal to 40° C. for the entire range of temperatures below or equal to 35° C., and in full lines (curve C2) the process described above, in which TS is equal to 30° C. for TA≦25° C. and to 40° C. for TA between 25° and 35° C.

The valve 7 ensures the maintenance of constant purity of the nitrogen, by one or another of the following methods:

According to a first method, an analyzer (not shown) measures the oxygen content of the gas moving in the conduit 21 and, as a function of this measurement, controls the opening of the valve 7. More precisely, if the purity of nitrogen falls below a predetermined threshold, the analyzer causes a reduction of the opening of the valve, and vice versa.

According to a second method, the valve 7 is arranged in a flow rate regulator, which is to say that it is coupled to a constriction, disposed upstream in the conduit 21, which controls its opening. The flow rate thus adjusted corresponds to a reference value which is displayed as a function of the separation temperature TS, and which can therefore be controlled by the detector 18A. The law of variation of flow rate permitting maintaining a constant purity of the nitrogen produced, is determined from parameters of the permeator.

The process described above can be modified as follows.

In practice, the effect on the permeator of a change of heating temperature in 5, shows up only after about ten minutes, and stabilization does not take place except at the end of 30 minutes to 1 hour, the time necessary for the membranes to reach the new separation temperature.

Therefore, upon a change in the value of TS, the permeation area cannot be modified by manipulation of valves 22B and 23B, until after a predetermined time or else, as a modification, when the outlet pressure is modified to a predetermined value.

Another modification of the process consists in introducing hysteresis during changes of the temperature TS. Thus, in the example described above, we increase TS from 30° to 40° C. when the temperature TA exceeds 26° C., and return TS from 30° to 40° C. when the temperature TA falls below 24° C.

As still another variant, to refine the adaptation of the permeator to the air compressor, the permeator can be subdivided into three permeation assemblies and two ambient threshold temperature values and three values of TS. Of course, the number of permeation assemblies could also be greater than three.

For example, for TA$\leq$25° C., TS=30° C. and the three permeation assemblies are in service. For 25° C.<TA$\leq$30° C., TS=35° C. and only two assemblies are in service. And for 30° C.<TA<35° C., TS=40° C. and a single assembly is in operation. This is shown in mixed lines at two points in FIG. 2 (curve C3).

Of course, by such modifications, the installation is rendered more complex.

To use a conventional permeator with a constant permeation area, another manner of maintaining the relative humidity of the air below 80% during an increase of the temperature TA consists, for each value of TA greater than a certain threshold, for example TA=25° C., to chose TS=TA+5° C. and to let the outlet pressure adapt itself in a corresponding manner, which is to say to fall when TA increases. This manner of proceeding can be suitable in numerous cases in which the use of nitrogen takes place continuously at a pressure substantially lower than the corresponding outlet pressure at TS=40° C.

Such an embodiment is shown in broken lines at one point in FIG. 2 (curve C4).

By way of numerical example, there is used an installation comprising a compressor 2 of the lubricated screw type, supplying 13 bars of pressure. The assemblies 6A and 6B have respectively permeation areas of 2210 m$^2$ and 520 m$^2$. The purity of the nitrogen produced is maintained at 99° by means of an oxygen analyzer, and the nominal flow rate of nitrogen for TA=20° C. is selected as base 100.

The following table gives flow rates and pressures of nitrogen (in relative bars) for various temperatures TA, for the two principal modes of operation of the process of the invention described above.

| Flow rates of a unit at 99% at a variable temperature TA | | | | | |
|---|---|---|---|---|---|
| TA (°C.) | | 20 | 25 | 30 | 35 |
| TS = 30° C./40° C. | Flow rate | 100 | 97 | 88 | 86 |
| Variable area | Pressure | 10.4 | 10.2 | 10.3 | 10.0 |
| TS = 30° C./ | Flow rate | 100 | 97 | 90 | 82 |
| TA + 5° C. | Pressure | 10.4 | 10.2 | 8.7 | 7.5 |
| Constant area | | | | | |

It is to be noted that the process of the invention could also be of interest to produce nitrogen at current purity ($\leq$93%) in warm climates. Thus, one could then operate the membranes under conditions of improved longevity, at reduced temperature, for most of the time.

As another variant, the refrigerant fluid used in 3 could be water, refrigerated if desired by a supplemental circuit. In this case, the temperature TA mentioned above is the inlet temperature of the water in the exchanger, and the detector 18B detects this temperature to control the detector 18A and the thermostat 26.

In the process according to the invention, it is of course possible, as known per se, to recycle to the inlet of the compressor 2 a fraction of the permeate from the permeator 6.

What is claimed is:

1. Installation for the separation of air by permeation, for the production of nitrogen, comprising in series an air compressor, a refrigerator, a unit for filtering out oil and water, an air reheater and a permeator, the reheater having means for adjustment of the temperature of air entering the permeator as a function of the temperature of a final refrigerant in the refrigerator.

2. Installation according to claim 1, wherein the air reheater comprises a passage for heat exchange fluid and an adjustable bypass for this passage.

3. Installation according to claim 1, wherein the permeator comprises at least two permeation assemblies, at least one of these assemblies having means for placing it out of service.

4. Process according to claim 1, wherein the values of temperature TA comprised between TA2 and a value TA3 higher than TA2, the temperature TS is adjusted to a constant value TS3 such that TS3–TA3$\geq$$\Delta$T.

5. Process according to claim 3, wherein for values of temperature TA comprised between TA2 and a value TA3 higher than TA2, the area of permeation is again reduced to a third value A3 less than A2.

6. Process according to claim 1, wherein for an interval of values of temperature TA greater than TA1, TS is adjusted to a variable value TA+$\Delta$T.

7. Process according to claim 1, wherein the values of TA1 and $\Delta$T are respectively about 25° C. and about 5° C.

8. A process for the production of nitrogen by permeation, comprising the steps of:

compressing feed air in a compressor;

refrigerating the compressed air using at least one refrigerant;

measuring a temperature TA of a final one of the at least one refrigerant;

purifying the refrigerated air; and adjusting a temperature TS of the purified air entering a permeator in which nitrogen is a retentate based on the measured temperature TA of the final refrigerant so that, for TA less than or equal to a first threshold temperature TA1, TS is a constant equal to the sum of TA1 and delta T, where delta T is a predetermined value, and for TA between TA1 and a second threshold temperature TA2 greater than TA1, TS is greater than or equal to the sum of TA and delta T.

9. The process of claim 8, wherein the final refrigerant is a liquid.

10. The process of claim 8, wherein the final refrigerant is water.

11. The process of claim 8, wherein the final refrigerant is air.

12. The process of claim 8, wherein for TA between TA1 and TA2, TS is a constant.

13. The process of claim 8, wherein for TA less than or equal to TA1, further comprising the step of permeating the air at temperature TS using a first permeation area, and wherein for TA between TA1 and TA2, further comprising the step of permeating the air at temperature TS using a second permeation area smaller than the first permeation area.

14. The process of claim 8, wherein for TA between TA2 and a third threshold temperature TA3 greater than TA2, TS is a constant greater or equal to the sum of TA3 and delta T.

15. The process of claim 14, wherein for TA between TA2 and TA3, further comprising the step of permeating the air at temperature TS using a third permeation area smaller than the second permeation area.

16. The process of claim 8, wherein for TA greater than TA1, TS is a variable equal to the sum of TA and delta T.

17. A process for the production of nitrogen by permeation, comprising the steps of:

compressing feed air in a compressor;

refrigerating the compressed air using at least one refrigerant;

measuring a temperature TA of a final one of the at least one refrigerant;

purifying the refrigerated air; and adjusting a temperature TS of the purified air entering a permeator in which nitrogen is a retentate based on the measured temperature TA of the final refrigerant so that, for TA less than or equal to about 25° C., TS is equal to about 30° C., for TA greater than about 25° C. and less than a second threshold temperature TA2 greater than 25° C., TS is at least about 5° C. greater than TA.

18. The process of claim 17, wherein the final refrigerant is water.

19. The process of claim 17, wherein the final refrigerant is air.

20. The process of claim 17, wherein for TA less than or equal to 25° C., further comprising the step of permeating the air at about 30° C. using at least two permeation areas, and wherein for TA greater than 25° C., further comprising the steps of at least partially closing an inlet to one of the permeation areas and permeating the air at about 30° C. using a remaining portion of the permeation areas.

* * * * *